United States Patent

Grant et al.

[11] Patent Number: 5,184,258
[45] Date of Patent: Feb. 2, 1993

[54] HELICAL SCAN MAGNETIC TAPE RECORDER WITH CAPSTAN ASSISTED VACUUM THREADING

[75] Inventor: Frederic F. Grant, Bellflower; Vincent J. Piarulli, Siri Valley, both of Calif.; Alexander R. Maxey, Eugene, Oreg.; Robert Ryerson, San Gabriel, Calif.

[73] Assignee: Datatape Incorporated, Pasadena, Calif.

[21] Appl. No.: 712,834

[22] Filed: Jun. 10, 1991

[51] Int. Cl.⁵ .................................. G11B 15/60
[52] U.S. Cl. ........................... 360/85; 360/95; 360/130.23
[58] Field of Search .................. 360/84-85, 360/95, 130.2-130.24; 242/182-185

[56] References Cited

U.S. PATENT DOCUMENTS

| | | | |
|---|---|---|---|
| 2,952,010 | 9/1960 | Demer et al. | 226/97 X |
| 3,134,527 | 5/1964 | Willis | 360/90 X |
| 3,134,528 | 5/1964 | Dickey | 360/90 X |
| 3,674,942 | 7/1972 | Sugaya et al. | 360/85 |
| 3,940,791 | 2/1976 | Kayan et al. | 360/95 |
| 4,050,090 | 9/1977 | Kollar | 360/130.23 |
| 4,259,700 | 3/1981 | Gause et al. | 360/95 |
| 4,413,293 | 11/1983 | Hathaway | 360/85 |
| 4,541,024 | 9/1985 | Sieben | 360/85 |
| 4,620,678 | 11/1986 | Kumakura et al. | 242/195 |
| 4,642,706 | 2/1987 | Vollmann et al. | 360/95 X |
| 4,763,210 | 8/1988 | Grant | 360/84 |
| 4,772,969 | 9/1988 | Grant | 360/85 |
| 4,779,150 | 10/1988 | Grant | 360/85 |
| 5,003,424 | 3/1991 | Grant | 360/130.23 |

OTHER PUBLICATIONS

IBM/TDB vol. 12, No. 6, Nov. 1969, pp. 808-809, "Automatic Threading of Web Material" by R. A. Johnson.

Primary Examiner—John H. Wolff
Attorney, Agent, or Firm—William F. Noval

[57] ABSTRACT

A helical scan magnetic tape recorder includes a rotary magnetic head scanner and a received magnetic tape cassette including spaced coplanar supply and take-up reels having magnetic tape spooled on the reels with a span of magnetic tape extending between the reels. Supply and take-up vacuum cavities are located contiguous to and on respective opposite sides of the scanner. Supply and take-up capstans are spaced from the rotary head scanner located in a tape transport path between the vacuum cavities and the tape cassette. Magnetic tape is initially removed from the cassette and moved to a tape vacuum loading position where it partially contacts the rotary head scanner, by a mechanical threading device. Thereafter, vacuum is applied to the vacuum cavities to draw the tape into contact with the vacuum cavities to substantially wrap the tape around the rotary head scanner. The supply and take-up capstans are rotated during vacuum threading to assist drawing the tape into the vacuum cavities.

3 Claims, 2 Drawing Sheets

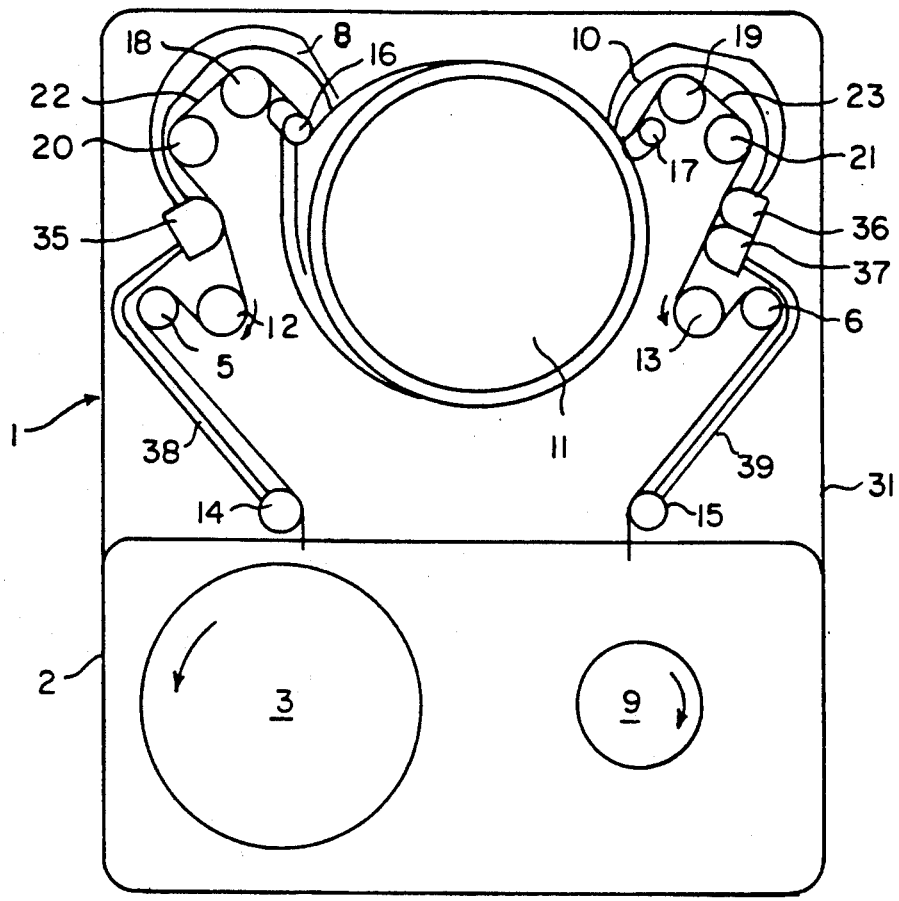
FIG. 3
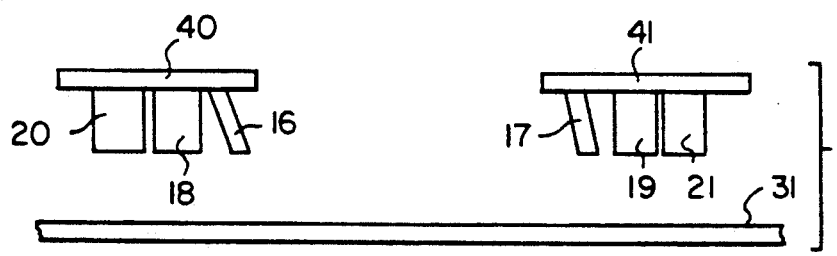
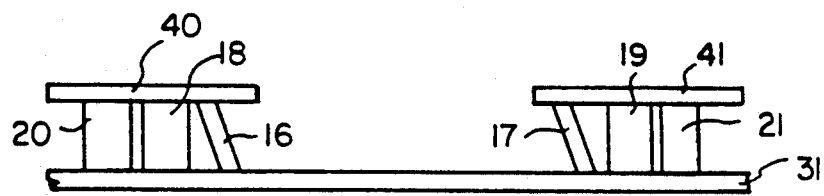
FIG. 5

HELICAL SCAN MAGNETIC TAPE RECORDER WITH CAPSTAN ASSISTED VACUUM THREADING

BACKGROUND OF THE INVENTION

This invention relates in general to magnetic tape recording/reproducing apparatus and more particularly to a helical scan magnetic tape recorder/player.

Various techniques have been proposed for use in magnetic tape recorder/players for threading magnetic tape from a cassette into a tape transport path and for guiding the tape along such path. Both manual and automatic mechanical arrangements have been proposed for threading magnetic tape from a cassette. Such mechanical arrangements involve mechanical guide elements and linkages which extract a length of magnetic tape from a cassette and which move the tape to a final tape transport path. The path is defined by the guide elements and includes one or more magnetic heads. The mechanical arrangement must then provide for guiding the tape during transport past the magnetic head. Both the tape threading operation and the tape transport operation typically requires some components of the overall mechanism to be employed in one operation but not in the other operation. For example, one or more motors and associated linkages may be used for a tape threading operation but play no part in the tape transport operation. During threading operation, the various linkages and guide elements are moved over considerable distances and must be accurately located to establish a tape guide path which permits accurate recording and playback of information on the magnetic tape. Purely mechanical tape threading mechanisms are both expensive and complex and tape threading and unthreading is relatively time consuming. The following patents are illustrative of mechanical tape threading and guiding arrangements: U.S. Pat. No. 3,674,942, issued Jul. 4, 1972, Inventors—Sugaya et al.; U.S. Pat. No. 4,259,700, issued Mar. 31, 1981, Inventors—Galue et al.; U.S. Pat. No. 4,642,706, issued Feb. 10, 1987, Inventors—Vollmann et al; U.S. Pat. No. 4,541,024, issued Sep. 10, 1985, Inventor—Sieven; and U.S. Pat. No. 3,678,217, issued Jul. 18, 1972, Inventor—Kihara.

In order to ameliorate the problems associated with mechanical threading arrangements for magnetic tape recorders, various techniques have been proposed for pneumatically threading magnetic tape into a magnetic tape recorder from a cassette or cartridge. Thus, U.S. Pat. No. 4,620,678, issued Nov. 4, 1986, Inventors—Kumakura et al. discloses a cartridge loading system wherein magnetic tape contained in a single reel cartridge is threaded into a transport mechanism having a take-up reel. Threading is effected by means of air streams which carry a leading end portion of the magnetic tape from an open supply reel via a channel to a take-up reel until the leading end portion is wound around the take-up reel hub. U.S. Pat. No. 4,413,293 issued Nov. 1, 1983, Inventor—Hathaway; U.S. Pat. No. 3,940,791, issued Feb. 24, 1976, Inventors—Kayan et al. and IBM Technical Disclosure Bulletin, Volume 12, Number 6, pp. 808 and 809, dated Nov. 19, 1969, disclose arrangements for automatically threading tape contained in a two-reel cassette into a magnetic tape transport containing a helical scan magnetic head assembly or the like. The pneumatic threading arrangements disclosed in the former two patents are disadvantageous because the individually movable guide elements disclosed in these references are complex and subject to reliability problems.

Besides effecting threading of magnetic tape into magnetic tape recorder transport path, various arrangements have been proposed for using vacuum columns and the like to effect control of magnetic tape as it is transported along a path from one reel to another. Such vacuum column arrangements are disclosed, for example, in U.S. Pat. No. 3,134,527, issued May 26, 1964, Inventor—Willis; U.S. Pat. No. 3,134,528, issued May 26, 1964, Inventor—Vickey; U.S. Pat. No. 2,952,010, Sep. 6, 1960, Inventors—Vemer et al. A combined pneumatic threading and guiding arrangement is disclosed in commonly assigned U.S. Pat. No. 4,779,150, issued Oct. 18, 1988, Inventor—Grant; U.S. Pat. No. 4,772,969, issued Sep. 10, 1988, Inventor—Grant; and U.S. Pat. No. 4,763,210, issued Aug. 9, 1988, Inventor—Grant. The arrangements disclosed in the latter three patents require the application of a vacuum during both the threading and tape transport operations.

There is thus a need for a helical scan magnetic tape recorder which is reliable and cost effective, which has a minimum of components and in which tape threading and guiding is simple and reliable and in which tape threading is effected in a fast and gentle manner while minimizing stress or edge damage to the tape.

SUMMARY OF THE INVENTION

According to the present invention, there is provided a helical scan magnetic tape recorder which obviates the disadvantages of known magnetic tape recorders. According to an aspect of the present invention, magnetic tape contained in a cassette is threaded from the cassette into a tape transport path of a rotary magnetic head scanner in a fast but gentle manner so that stress or edge damage to the tape is avoided. Tape threading is effected with a simple and reliable structure with few parts. According to an aspect of the present invention, a helical scan magnetic tape recorder includes a rotary magnetic head scanner, supply and take-up vacuum cavities located contiguous and on opposite sides of the scanner and supply and take-up capstans spaced from the rotary head scanner and located in a tape transport path between the vacuum cavities and a magnetic tape cassette. Mechanical threading means removes tape from the cassette and moves it to a tape vacuum loading position where the tape partially contacts the rotary head scanner. According to another aspect of the present invention, vacuum means applies a vacuum to the vacuum cavities after the tape has been moved into the tape vacuum loading position, to draw the tape into contact with the vacuum cavities on opposite sides of the rotary head scanner to substantially wrap the magnetic tape around said scanner. During vacuum threading the supply and the take-up capstans are rotated to assist drawing the tape into said vacuum cavities.

BRIEF DESCRIPTION OF THE DRAWINGS

In detailed description of the preferred embodiments of the invention presented below, reference is made to the accompanying drawing in which like numerals refer to like elements.

FIGS. 1, 2 and 3 are respective diagrammatic plan views of an embodiment of the present invention useful in describing the operation thereof.

FIGS. 4 and 5 are elevational views useful in describing the operation of the moveable guide elements.

DESCRIPTION OF THE PREFERRED EMBODIMENTS

Figure 1:
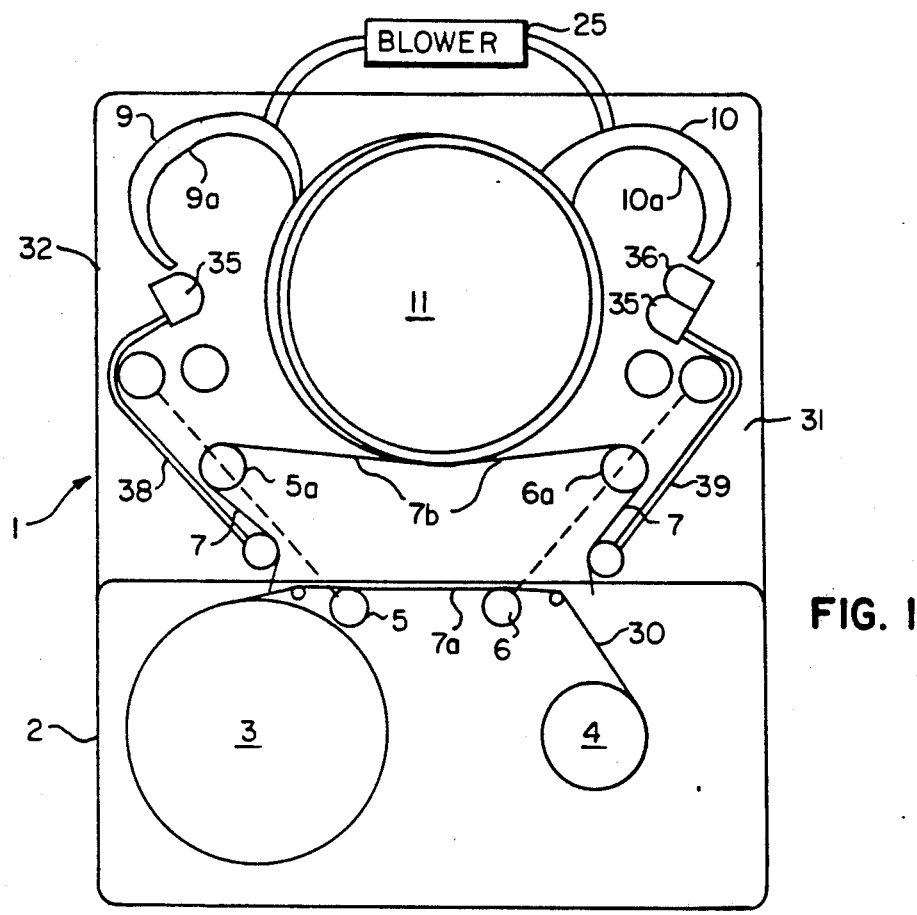

Referring now to the figures, there is shown a preferred embodiment of the present invention. As shown, a helical scan magnetic tape recorder includes tape transport 1 which receives magnetic tape cassette 2. Cassette 2 contains reels 3 and 4 of tape 30, and provides a protective enclosure for carrying, storing and handling the tape without the operator touching it. Likewise, it is very desirable that the operator not touch the tape in loading it into the transport. Rollers 5 and 6 are a part of the tape transport 1 and are so located that when the cassette is installed on transport 1, the tape strand 7A from tape reel 3 to tape reel 4 comes in front of rollers 5 and 6. When the cassette 2 is in place, rollers 5 and 6 are motor driven to positions 5A and 6A by a motor and mechanism described in copending, commonly assigned U.S. patent application Ser. No. 07/712822, entitled "Magnetic Tape Threading and Compliance Element Guiding Apparatus". Tape 30 is withdrawn from the cassette 2 to a position shown by the tape strand 7B. The space on the transport 1 traversed by the tape 30 is surrounded by a floor 31 a covering above (not shown) and a surrounding wall 32. Vacuum cavities 9 and 10 are located contiguous to and on opposite sides of, rotary head scanner 11. A blower 25 vents cavities 9 and 10 to create a vacuum therein. The vacuum draws air through respective perforated walls 9A on the supply tape side and 10A on the take-up tape side.

Figure 2:
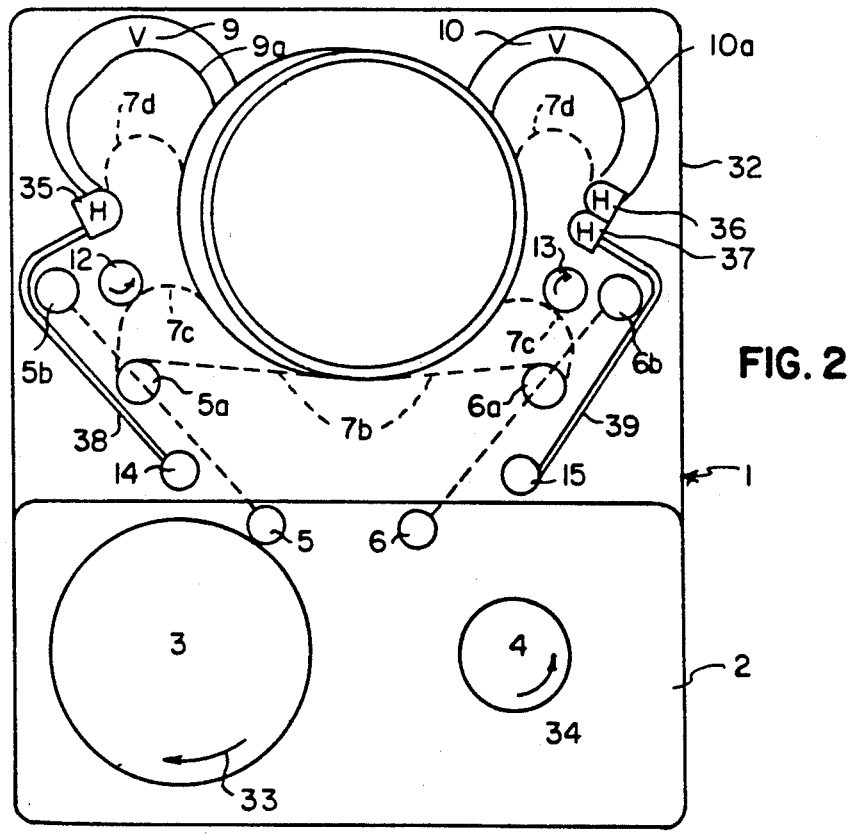

When the tape 30 has been pulled by rollers 5 and 6 to positions 5A and 6A (FIG. 1) and the tape 30 is in position 7B against the scanner 11, the vacuum blower 25 is turned on. The tape spooling reels 3 and 4 are also motor driven slowly in the unspooling direction shown by the arrows 33, 34 (FIG. 2) so the tape 30 goes slack. The low tension present in the tape strand 7A results from the air flow through walls 9A and 10A into the vacuum cavities 9 and 10. This draws the slack tape 30 into position 7C (FIG. 2) where it begins to wrap on the scanner 11 and comes into contact with the supply capstan 12 and the take-up capstan 13. The capstans 12 and 13 can be motor driven slowly in the direction of the loading tape movement to aid the tape threading.

As the tape 30 is drawn to positions shown by 7D, it wraps on the scanner 11 and comes into contact with the fixed heads 35, 36, 37. As the tape approaches the wall 9A on the supply side and the wall 10A on the take-up side, it will contact the portion of the walls 9A, 10A near the scanner 11 first, because that portion has a larger radius and hence results in a higher tension to pull the tape 30 into place.

The walls 9A and 10A are curved to bring the tape 30 past the position of guiding elements 16-21 (FIG. 3) which are positioned out of the tape path during threading. In addition, walls 9A and 10A are twisted laterally so that the tape 30 that approaches the scanner 11 from wall 9A is pointed upward about 5° to conform to the helix angle of the tape 30 on the scanner 11. Similarly, the tape 30 between wall 10A and the scanner 11 points downward about 5° to conform to the helix angle of the tape on the scanner 11 in operation.

Since the scanner 11 is tilted, e.g., at 12° to the right (as shown in the figures), the tape helix, which progresses upward in the counter clockwise direction will deviate from the plane of the page and from the floor or cover of the tape path enclosure. This enclosure confines the air space to cause the air to act effectively on the tape. The enclosure consists of surrounding walls which include curved walls 9A and A and additional walls 38, 39. Walls 38 and 39 run respectively from the heads 35, 37 on both sides of the scanner and extend outside of the extractor rollers 5A and 6A positions and the positions where these rollers 15, 16 become compliance rollers (at 5B and 6B) and finally, to the cassette tape exit control rollers 14 and 15. In addition, the enclosure has a floor 31 (in the plane of the paper) which is recessed in area 13 adjacent to the scanner 11 and a top cover (not shown) which is recessed in area 12 adjacent to the scanner. These recesses are to accommodate the deviation of the tape helix from the plane of the floor and top cover. (These surfaces are called floor and cover to refer to the drawing—in actual use the recorder can be used in any orientation.)

Within the vacuum cavities 9 and 10, there are optical sources and sensors (not shown) to sense when the tape 30 is completely in position against the walls 9A and 10A. When this is verified, elevator 40 and 41 (FIGS. 4 and 5) (not shown) are actuated to lower guide posts 16 and 17 and entry roller 18 and exit roller 19 and adjacent rollers 20 and 21. Items 16, 18 and 20 are on elevator 40 and items 17, 19 and 21 are on elevator 41. When guides 16 and 17 and rollers 18, 19, 20 and 21 are in place (FIG. 5), the vacuum blower 25 (FIG. 1) is turned off as the tape is tensioned by rotating the reels 3 and 4 in the spooling direction. Capstans 12 and 13 are also rotated, to take up the slack of tape 30 and to move the tape segments 22 and 23 tightly into position around the guiding elements 16 thru 21 recently brought into place.

The tape unthreading process uses the opposite sequence of events. Blower 25 is activated to create a vacuum to draw the tape 30 against walls 9A and 10A. Elevators 40, 41 move items 16 through 21 out of the tape path and the tape 30 is withdrawn into the cassette 2 with opposite sequence of events to that with which it was extracted.

The invention has been described in detail with reference to the figures, however, it will be appreciated that variations and modifications are possible within the spirit and scope of the invention.

What is claimed is:

1. A helical scan magnetic tape recorder comprising:
a rotary magnetic head scanner;
supply and take-up vacuum cavities located contiguous to and on respective opposite sides of said scanner;
means for receiving a magnetic tape cassette including spaced, coplanar, supply and take-up reels having magnetic tape spooled on said reels with a span of magnetic tape extending between said reels;
supply and take-up capstans, spaced from said rotary head scanner and located in a tape transport path between said vacuum cavities and a received magnetic tape cassette;
mechanical threading means for removing said tape from said cassette and moving it to a tape vacuum loading position where said tape partially contacts said rotary head scanner;
vacuum means for applying vacuum to said vacuum cavities, after said tape has been moved to said tape vacuum loading position, to draw said tape into contact with said vacuum cavities on opposite sides of said rotary head scanner to substantially wrap said tape around said rotary head scanner; and wherein said supply and take-up capstans contact said tape during said vacuum threading and are rotated to assist drawing said tape into said vacuum cavities.

2. The recorder of claim 1 including first and second sets of tape guide element located on opposite sides of said rotary head scanner in the region of said vacuum cavities and first and second elevator means for respectively moving said first and second set of guide elements between a first position out of said tape path, while said tape is being drawn into said vacuum cavities, and a second position coplanar with said vacuum cavities to function as tape guide elements, after vacuum is removed from said vacuum cavities and said tape is transported in a tape path defined by said first and second set of tape guide elements and said rotary head scanner.

3. The system of claim 2 wherein said tape is unthreaded and returned to said cassette such that vacuum is applied to said vacuum cavities to draw said tape into contact with said cavities and out of contact with said first and second sets of guide elements and said first and second elevator means respectively move said first and second sets of guide elements between said second and first positions thereby to let said tape be drawn back into said cassette.

* * * * *